Nov. 24, 1959 R. B. BOURNE ET AL 2,914,132
FULL-PACK SILENCER
Filed June 2, 1953 2 Sheets-Sheet 1

INVENTORS
ROLAND B. BOURNE and
JOHN P. TYSKEWICZ
BY Roger B. McCormick
ATTORNEY

Nov. 24, 1959    R. B. BOURNE ET AL    2,914,132
FULL-PACK SILENCER
Filed June 2, 1953    2 Sheets-Sheet 2
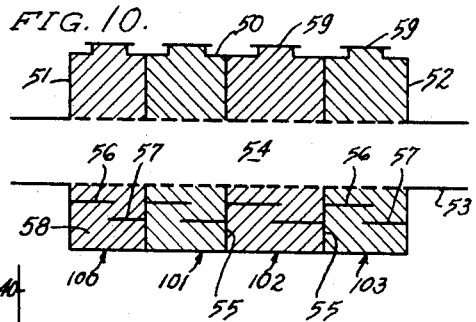
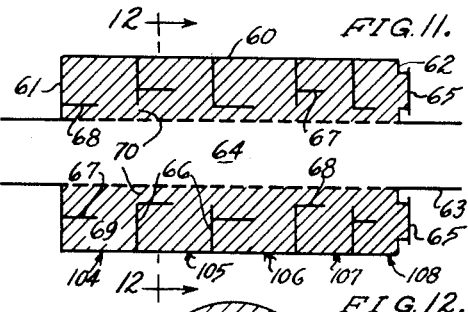
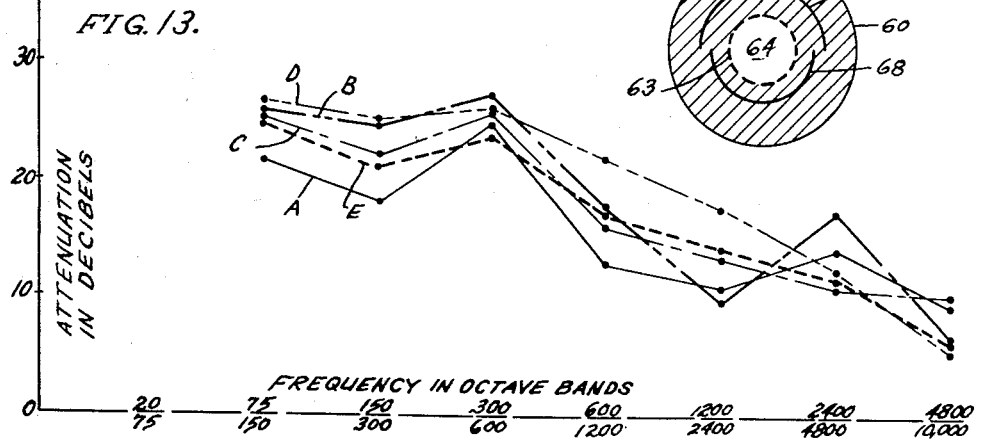
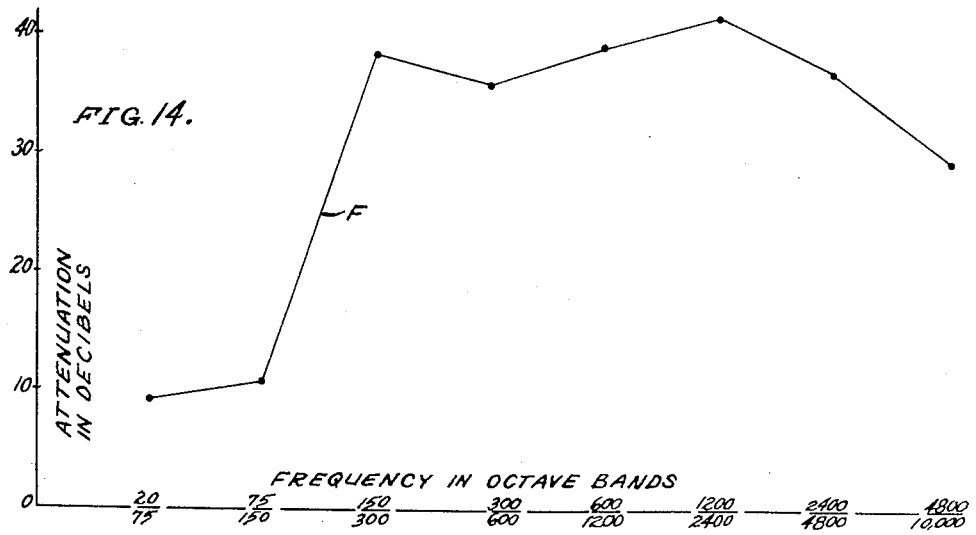
INVENTORS
ROLAND B. BOURNE and
JOHN P. TYSKEWICZ
BY
Roger B. McCormick
ATTORNEY

# United States Patent Office 2,914,132
Patented Nov. 24, 1959

2,914,132

FULL-PACK SILENCER

Roland B. Bourne, West Hartford, and John P. Tyskewicz, Hartford, Conn., assignors, by mesne assignments, to Emhart Manufacturing Company, Hartford, Conn., a corporation of Delaware Application June 2, 1953, Serial No. 359,102

13 Claims. (Cl. 181—42)

This invention relates to improvements in silencing devices of the type characterized by a straight through main sound and gas conducting channel having a perforate wall and which is surrounded by an enclosing shell packed full of sound absorbing material of one kind or another.

The principal deficiency of conventional silencers of the aforementioned type lies in the relatively little attenuation of low frequency sound waves. In the conventional "full-packed silencers" the lowest frequency for which substantial attenuation is obtained is governed by the radial distance from the main channel to the wall of the surrounding shell. When this distance is equal to an acoustic quarter wave, maximum attenuation results, other things being equal. Naturally, low frequency sound waves can be attenuated by using large diameter silencers, but large diameter silencers are frequently impractical for the space requirements of the installations and are too expensive. And, since the radial depth rule for maximum attenuation applies also to the high frequency end of the sound spectrum, any gain in low frequency attenuation may be overshadowed by loss of attenuation in the high frequency range. In addition, a thick layer of sound absorbing material in large diameter silencers may be efficient for low frequency attenuation but quite inefficient for high frequency attenuation.

Various attempts have been made to improve the response of silencers to low frequency sound waves. For example, U.S. patent Re. 22,283 describes a method of improving the low frequency response by surrounding the perforate main channel with a second perforate tube within the enclosed shell and disposing the sound absorbing material only between the inner and outer perforate tubes.

In addition, silencers of the full pack type have been constructed with the straight through main channel offset from the axis of the cylindrical shell so that different radial distances are presented between the main channel and the shell. Examples of this type are shown in U.S. Patent 2,046,193.

Also, sound absorbing blankets have been constructed, with a view to improving the absorption coefficient for low frequencies, by building up a composite structure of layers of sound absorbing material separated by thin, flexible septums which conspire to acoustically "load" the material, thus making it more effective at low frequencies.

In the present invention, we make use of the principle of different radial distances between the main channel and an impervious sound reflecting wall which may be either the outer shell of the device or one or more unyielding, imperforate plates embedded in the sound absorbing material. That part of the material which is disposed outwardly from an embedded baffle is in communication with the main channel, not through the embedded wall or septum but through the sound absorbing material surrounding a portion of the main channel which is not embraced by said baffle. This results in a longer acoustic path from a portion of the main channel not embraced by an embedded plate or baffle than is afforded by radial distance alone. This will be apparent in the detailed descriptions to follow.

Other objects as well as advantages of the invention will become apparent to those skilled in the art from the following description of the annexed drawings wherein several embodiments of the invention are schematically illustrated and wherein, Fig. 1 is a longitudinal cross-sectional view of a conventional full-packed silencer;

Fig. 10 is a longitudinal sectional view of a composite silencer structure comprising a plurality of sections;

Fig. 11 is a longitudinal sectional view of another composite silencer structure;

Fig. 12 is a transverse sectional view of the last mentioned silencer taken as indicated by the line 12—12 of Fig. 11;

Fig. 13 is a graph plotting the performance curves resulting from tests of silencing devices shown in Figs 1 to 8 inclusive; and Fig. 14 is a graph plotting the performance curves resulting from a test of the silencer shown in Fig. 10.

Figure 1:
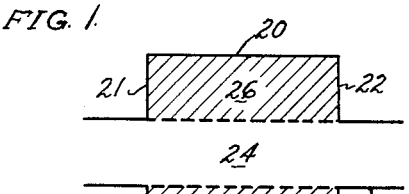

In Fig. 1 there is shown a conventional full-pack single section silencing device for purposes of comparison in structure and performance with the silencing devices of the present invention. The said conventional silencer comprises a generally cylindrical shell 20 which is closed at its ends by headers 21 and 22 and which surrounds in spaced relationship a perforate tube 23 extending through appropriate centrally located openings in the said end headers. The tube 23 defines the main sound and gas conducting channel 24 which is acoustically coupled through the perforations to the chamber 26 defined within the closed shell 20 around the perforate tube 23. The chamber 26 is filled with sound absorbing material 27. The aforedescribed single section conventional full-packed silencer is constructed in accordance with U.S. Patent 1,811,762, issued June 23, 1931.

As previously mentioned, the aforedescribed silencing device is presented for purposes of comparison with the silencing devices of the present invention. In each of the devices shown in Figs. 2 to 8, a shell, headers, perforate tube, and sound absorbing pack are provided which are similar in all respects to their counterparts shown in Fig. 1 and, accordingly, the same reference characters are applied thereto. It should be noted that in testing the various silencer embodiments for purposes of comparison with the conventional silencers, each device utilized a shell 20 which was 18 inches in diameter and length, a perforate tube 23 of 6 inches diameter and the sound absorbing material used in each instance comprised screened coke having an average weight of approximately 38 pounds per cubic foot. In conducting the tests on the various silencer embodiments, a random noise generator was used with suitable amplifiers and loud speaker and a microphone was disposed in the main sound conducting channel between the noise generator and the silencer and a second microphone was disposed downstream of the silencer in a tail pipe communicating with the main sound and gas conducting channel. In conducting the test of the silencer shown in Fig. 10, resulting in the performance plot of Fig. 14, the second microphone was disposed in the main sound channel closely adjacent the silencer and no tail pipe was used. Accordingly, it is believed that the performance plot of Fig. 14 reflects results less favorable than would have been obtained with the use of a tail pipe.

In testing the conventional silencer device of Fig. 1 the results plotted by performance curve A in Fig. 13 were noted.

Figure 2:
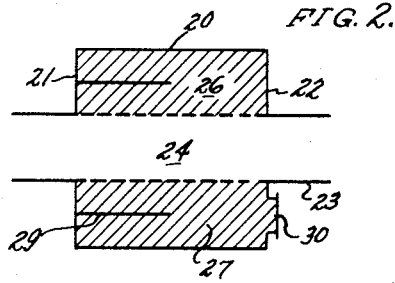
Fig. 2 is similar to Fig. 1 and illustrative of a single section silencing device constructed in accordance with the present invention.

In Fig. 2 there is shown a single section silencing device constructed in accordance with the present invention to provide a full-pack silencer which is particularly adapted to expose different thicknesses of the sound absorbing pack to sound waves for the purpose of improving the performance characteristics particularly in the low frequency end of the sound spectrum. More specifically, an arcuate plate in the form of a cylindrical sleeve 29 is provided to extend from one end header, such as the header 21, longitudinally of the shell 20 to approximately the midpoint thereof. The sleeve 29 which is embedded in the sound absorbing material 27 is arranged concentrically with the inner perforate tube 23 and is fixed outwardly therefrom, the sleeve 29 being approximately 12 inches in diameter and approximately 9 inches long. In other words, the sleeve 29 is approximately half the length of the shell 20, two-thirds of its diameter, and twice the diameter of the perforate tube 23. The aforedescribed arrangement of the sleeve permits acoustic communication between the sound absorbing material on the inner side of the sleeve and the sound absorbing material on the outer side thereof.

It will be seen that there are at least three different acoustic distances provided within the casing of the silencer. The shortest distance is that between the main channel 24 and the arcuate plate 29; the next longest is that between the main channel and the outer shell 20 and the longest is the path between the main channel, outwardly through the sound absorbing material 26, thence in a longitudinal direction to the end header 21. Each of these distances, of course, corresponds to a broad frequency band for which is achieved maximum attenuation.

Curve B of Fig. 13 plots the performance of the device of Fig. 2, and by comparing curve B to curve A, it will be noted that the silencing device of Fig. 2 offers greater attenuation over practically every octave band range tested as compared to the test results of the conventional silencing device.

There is shown in Fig. 2 a capped filler opening 30 disposed in the header 22 opposite the sleeve 29 to facilitate loading of the shell 20 with the sound absorbing material 27. It will be seen that the sound absorbing material can best be inserted when the silencer is placed in an upright position i.e., with its longitudinal axis disposed substantially vertically.

Figure 3:
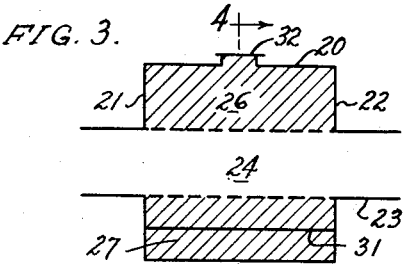
Fig. 3 is similar to Fig. 2 showing an alternative construction.
Figure 4:
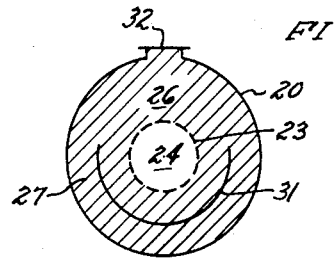
Fig. 4 is a transverse sectional view of the device shown in Fig. 3 taken as indicated by the line 4—4 of Fig. 3.

In Figs. 3 and 4 there is shown an alternative construction an accordance with the present invention wherein the baffle means takes the form of a substantially semi-cylindrical plate 31 which extends between the headers 21 and 22 and which is spaced approximately midway between the perforate tube and the shell 20 and which surrounds at least half of said tube. Although the plate 31 surrounds a substantial portion of the tube, it does not completely encircle it. As best shown in Fig. 4, the plate 31 is concentric to the perforate tube 23 and encompasses an arc greater than 180°. It is believed that satisfactory results will occur if the arc of curvature of the baffle plate 31 falls within the range of approximately 180° to approximately 240°. A capped filler 32 is provided on the upper side of the shell 20 so that the silencer can be full- packed with sound absorbing material while disposed in a horizontal position, i.e., with its longitudinal axis extending horizontally.

The test results of the embodiment of Figs. 3 and 4 is plotted by curve C of Fig. 13 and here again, such results compare very favorably with the results obtained with a conventional silencer as shown by curve A.

Figure 5:
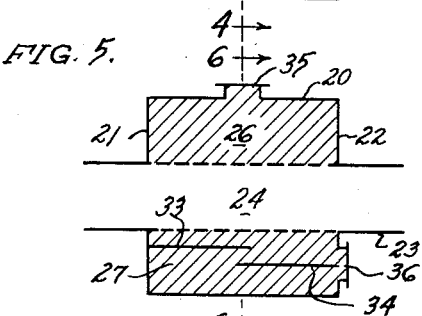
Fig. 5 is similar to Figs. 2 and 3 showing another modified form of construction.
Figure 6:
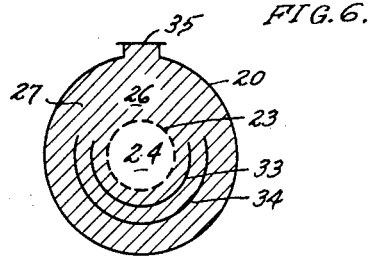
Fig. 6 is a transverse sectional view of the last mentioned device taken along the line 6—6 of Fig. 5.

Figs. 5 and 6 are illustrative of another alternative form of construction which provides a full-packed silencer wherein the sound waves are exposed to sound absorbing material in layers of varying thicknesses. As shown in Figs. 5 and 6, a semi-cylindrical plate 33 is arranged to extend longitudinally of the shell 20 from the header 21 in spaced concentric relationship with the perforate tube 23. The extending end of the said baffle 33 extends beyond the midpoint of the shell and said plate encompasses an arc of at least 180° so as to surround at least one-half of the tube 23. A second semi-cylindrical plate 34 is arranged to extend longitudinally of the shell 20 from the header 22 beyond the midpoint of said shell and in outwardly spaced relationship to the tube 23 and the first described plate 33. The baffle 34 encompasses an arc at least equal to 180° and substantially equal to the arc of the baffle 33 and is concentric to the tube 23 and the baffle 33. As best shown in Fig. 6, the baffle 33 is located at substantially one-quarter of the radial distance from the tube 23 to the shell 20 and the baffle 34 is located at substantially one-half said radial distance. It will also be noted that the extending inner ends of the baffles 33 and 34 are in overlapping relationship. The sound absorbing material 27 for the chamber 26 can be introduced through the capped filler means 35 provided at the side of the shell 20 and/or through the capped filler means 36 provided in the header 22. Accordingly, the silencing device described can be filled when in a horizontal position or when in a vertical position.

Performance curve D of Fig. 13 plots the test results of the silencing device of Figs. 5 and 6. It will be noted that the test results indicate more uniform attenuation throughout the frequency range. Also, at the lower end of the sound spectrum, performance was found to be considerably better than the performance of the conventional device tested.

Figure 7:
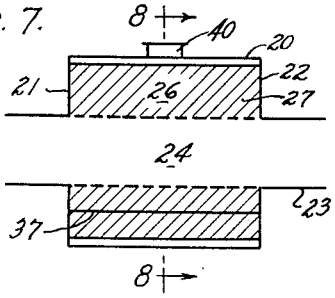
Fig. 7 is a longitudinal sectional view of another embodiment taken as indicated by the line 7—7 of Fig. 8.
Figure 8:
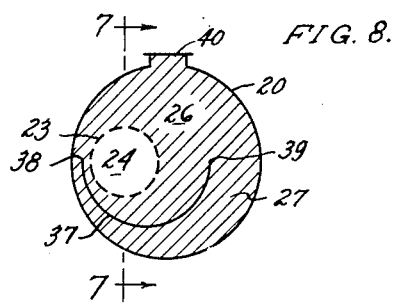
Fig. 8 is a transverse sectional view taken as indicated by the line 8—8 of Fig. 7.

In Figs. 7 and 8, there is shown another alternative construction wherein the perforate tube 23 is located in eccentric relationship with the surrounding cylindrical shell 20. There is also provided a substantially semi-cylindrical plate 37 which extends between the headers 21 and 22 and which is located in eccentric relationship with the tube 23 and with the shell 20. As best shown in Fig. 8, the arc of the plate 37 encompasses approximately 180° with one edge 38 thereof disposed substantially midway between the tube 23 and the adjacent wall of the shell 20 and the other edge 39 is disposed substantially midway between the tube 23 and the far wall of the shell 20. Obviously, a continuous range of pack thickness is provided between the perforate walls of the main sound conducting channel and the baffle or the shell. This particular embodiment of the invention can be advantageously applied to installations wherein the space limitations permit the use of silencers having a relatively large diameter. The sound absorbing material can be provided through the filler means 40 located on the side of the shell 20 when the silencer is disposed in a horizontal position or the silencer may be filled when in a vertical position through similar filler means provided on one of the headers.

Here again, the test results are indicative of improved performance compared to conventional silencers as can be seen by comparing curve E of Fig. 13 with the performance curve A of the conventional silencer.

Figure 9:
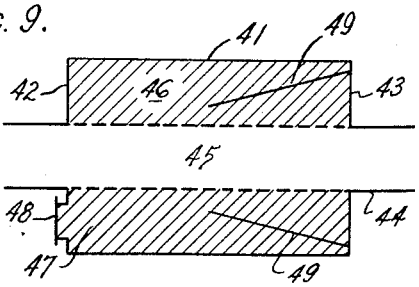
Fig. 9 is a longitudinal sectional view of still another embodiment of the invention.

In Fig. 9 there is shown a single section silencing device constructed in accordance with the present invention wherein a substantially cylindrical shell 41 is closed by end headers 42, 43 having centrally located openings for supporting a longitudinally extending perforate tube 44 which defines the main sound and gas conducting channel 45. The chamber 46 defined about the tube 44 by the shell 41 is packed with sound absorbing material 47 which can be admitted through filler means 48 located in the header 42. In this particular embodiment, the sound reflecting plate is provided in the form of a frusto-conically shaped sleeve 49 which is secured to the header 43 in concentric relationship to the perforate tube 44 to converge from the radially outer portion of said header 43 inwardly toward the tube 44. The sleeve 49 extends inwardly of the shell 41 to approximately its midpoint and the converging inner end of said sleeve is spaced from the tube 44 about one-third the radial distance from the tube to the shell.

It will be seen that the sleeve exposes the sound waves in that half of the tube 44 adjacent the header 43 to sound absorbing material of varying thicknesses to accomplish the ends of the present invention.

In Fig. 10 there is shown a composite silencer construction comprising a cylindrical shell 50 closed by end headers 51 and 52 having openings which support the longitudinally extending perforate tube 53 in concentric relationship with the shell 50. The tube 53 defines a main sound and gas conducting channel 54. A plurality of transverse partitions 55, 55 extend between the perforate tube 53 and shell 50 to divide the silencer into a plurality of silencing sections denoted by the reference characters 100, 101, 102, and 103. Since the partitions 55, 55 are unequally spaced along the tube 53, the silencer sections 100—103 are of varying lengths. However, each such section is similar to the silencer section shown in Figs. 5 and 6 and each includes an inner arcuate baffle 56 and an outer arcuate baffle 57. Each section is fully packed with sound absorbing material 58 disposed within the chamber between the shell 50, the perforate tube 53, and its respective headers. The sound absorbing material can be conveniently admitted to the various sections through filler means 59, 59 disposed on the side of the shell 50.

In Fig. 14, there is shown by the curve F the high performance test results achieved with the silencer constructed in accordance with the embodiment shown in Fig. 10.

In Fig. 11, there is shown a further silencer embodiment comprising a plurality of sections 104, 105, 106, 107 and 108 defined by a cylindrical shell 60 which is closed by end headers 61 and 62. A perforate tube 63 extends between the end headers to define the main sound and gas conducting channel 64. A pair of capped filler openings 65, 65 are provided in diametrically opposed positions on the end header 62 to admit sound absorbing material to the silencer. Internally of the silencer the various sections are further defined by transverse wall members 66, 66 irregularly spaced along the tube 63 and equally radially spaced therefrom. Each of the sections 104–108 is provided with a pair of diametrically opposed arcuate baffle plates 67 and 68 extending longitudinally approximately halfway through each section from an end header or from a transverse wall 66. The arcuate baffles 67 and 68 are each concentric to the tube 63 and shell 60 but are radially spaced from the tube 63 by different amounts. The arcuate baffle 68 is spaced from the center of the perforate tube 63 an amount equal to the radial spacing of the inner edge of the transverse walls 66 and the baffle 67 is spaced from the center of the tube 63 a distance greater than the radial distance from said center to the inner edge of the walls 66, 66. Accordingly, each of said sections has a chamber 69 defined between the shell 60 and the tube 63 which is acoustically coupled to the main channel 64 through the perforations and through the annular opening 70 defined between the inner edge of its transverse wall 66 and the periphery of the tube 63, said annular opening 70 providing communication between adjacent sections. It should be noted that adjacent sections have the arcuate baffles 67 and 68 arranged in staggered relationship i.e., if the baffle 68 is disposed on the upper side of one section, the baffle 67 will be disposed on the upper side of the next adjacent section.

In all of the various embodiments of the invention shown and described, there is provided impervious baffle means for exposing sound waves to an impervious wall after traveling from the main sound conducting channel through a sound absorbing pack of varying effective thickness. In each silencer embodiment the chamber defined by the enclosing shell surrounding the main conducting channel is fully packed with sound absorbing material. The advantages of having varying effective pack thickness defined by the baffle means will be understood by those skilled in the art as increasing the overall effectiveness of full-packed silencers. Attenuation will be greatly improved over a greater range of sound frequencies.

It will also be understood by those skilled in the art that various other composite structures can be constituted by combining the various embodiments shown and, therefore, it is not our intent to limit the scope of the invention to the particular embodiments and arrangements shown and described otherwise than indicated by the claims which follow.

We claim as our invention:

1. A silencer of the type described comprising in combination, a generally cylindrical shell, a pair of headers closing the ends of said shell each of which headers has an opening for the flow of sound and gas, a perforate tube of substantially less diameter than the said shell extending between said openings to define the main sound conducting channel, a body of sound absorbing material substantially filling the space between said tube and said shell, and an imperforate plate embedded within the said body of sound absorbing material in spaced relationship to said tube and surrounding a substantial portion of the said tube but permitting acoustic communication between the sound absorbing material on one side of the plate and the sound absorbing material on the other side of the plate, said plate being constructed and arranged to cooperate with the said shell in defining imperforate sound reflecting wall means at varying radial distances from the said tube.

2. A silencer of the type described comprising in combination, a generally cylindrical shell, a pair of headers closing the ends of said shell each of which headers has an opening for the flow of sound and gas, a perforate tube of substantially less diameter than the said shell extending between said openings to define the main sound conducting channel, a body of sound absorbing material substantially filling the space between said tube and said shell, and an imperforate arcuate plate embedded within the said body of sound absorbing material in spaced relationship to the said tube, which plate surrounds a substantial portion of the said tube and extends generally longitudinally of the said shell but permits acoustic communication between the sound absorbing material on one side of the plate and the sound absorbing material on the other side of the plate, the said plate being constructed and arranged to cooperate with the said shell in defining imperforate sound reflecting wall means at varying radial distances from the said tube.

3. A silencer of the type described comprising in combination, a generally cylindrical shell, a pair of headers closing the ends of said shell each of which headers has an opening for the flow of sound and gas, a perforate tube of substantially less diameter than the said shell extending between said openings to define the main sound conducting channel, a body of sound absorbing material substantially filling the space between said tube and said shell, and at least one imperforate arcuate plate embedded within the said body of sound absorbing material and extending from one of said end headers generally longitudinally of the shell in spaced relationship to the said tube and to the said shell but permitting acoustic communication between the sound absorbing material on one side of the plate and the sound absorbing material on the other side of the plate, which arcuate plate is concave inwardly with respect to the shell and surrounds a substantial portion of the tube, the said plate being constructed and arranged to cooperate with the said shell in defining imperforate sound reflecting wall means at varying radial distances from the said tube.

4. A silencer as defined in claim 3 wherein said arcuate plate is concentrically disposed relative to said tube on radii substantially greater than the radius of said tube.

5. A silencer as defined in claim 3 wherein said arcuate plate comprises a sleeve extending from said one header into said shell and terminating in spaced relationship to the other of said headers.

6. A silencer as defined in claim 3 wherein said arcuate plate encompasses an arc of at least 180°.

7. A silencer of the type described comprising in combination, a generally cylindrical shell, a pair of headers closing the ends of said shell each of which headers has an opening for the flow of sound and gas, a perforate tube of substantially less diameter than the said shell extending between said openings to define a main sound conducting channel, a body of sound absorbing material substantially filling the space between said tube and said shell, and imperforate baffle means embedded within the said body of sound absorbing material in spaced relationship to said tube and surrounding a substantial portion of the said tube, said baffle means being constructed and arranged to cooperate with the said shell in defining imperforate sound reflecting wall means at varying radial distances from the said tube, and said baffle means comprising a first arcuate plate extending generally longitudinally of said shell from one of said end headers and having its concave face opening inwardly with respect to the shell and a second arcuate plate extending generally longitudinally of said shell from the other of said end headers and having its concave face opening inwardly with respect to said shell, the said arcuate plates being spaced different distances from the tube and the shell.

8. A silencer as defined in claim 7 wherein said plates extend into said shell in spaced overlapping relationship to each other.

9. A silencer of the type described comprising in combination, a generally cylindrical shell, a pair of headers closing the ends of said shell each of which headers has an opening eccentrically disposed therein, a perforate tube of substantially less diameter than the said shell extending between said openings to define the main sound conducting channel, a body of sound absorbing material substantially filling the space between said tube and said shell, and an imperforate plate embedded within the said body of sound absorbing material in spaced relationship to said tube and to said shell, said imperforate plate being arcuate with its concave face opening inwardly with respect to said shell and extending generally longitudinally of said shell from one of said end headers but permitting acoustic communication between the sound absorbing material on one side of the plate and the sound absorbing material on the other side of the plate, and said arcuate plate being disposed eccentrically with respect to said tube and said shell and surrounding a substantial portion of the said tube to cooperate with the said shell in defining imperforate sound reflecting wall means at varying radial distances from the said tube.

10. A silencer of the type described comprising in combination, a generally cylindrical shell, a pair of headers closing the ends of said shell each of which headers has an opening for the flow of sound and gas, a perforate tube of substantially less diameter than the said shell extending between said openings to define the main sound conducting channel, a body of sound absorbing material substantially filling the space between said tube and said shell, and baffle means embedded in said body of sound absorbing material in spaced relationship to said tube and said shell to cooperate with the said shell in defining imperforate sound reflecting wall means at varying radial distances from the said tube, said baffle means comprising an imperforate frusto-conical sleeve surrounding a substantial portion of the said tube and extending from one of said end headers toward the other of said end headers.

11. A silencer as defined in claim 10 wherein said frusto-conical sleeve is disposed in concentric relationship with said tube and with its large diameter end fixed to said one end header.

12. A silencer of the type described comprising in combination, a generally cylindrical shell, a pair of headers closing the ends of said shell each of which headers has an opening for the flow of sound and gas, a perforate tube of substantially less diameter than the said shell extending between said openings to define the main sound conducting channel, a body of sound absorbing material substantially filling the space between said tube and said shell, and baffle means embedded in said body of sound absorbing material in spaced relationship to said tube and to said shell to cooperate with the said shell in defining imperforate sound reflecting wall means at varying radial distances from the said tube, said baffle means comprising a first arcuate plate extending generally longitudinally of the shell from one of said end headers with its concave face opening inwardly with respect to said shell, and a second arcuate plate extending generally longitudinally of the shell from said one end header with its concave face opening radially inwardly with respect to said shell, said first and second arcuate plates being disposed at different radial distances from the tube surrounding a substantial portion of the said tube.

13. A silencer as defined in claim 12 wherein each of said arcuate baffle plates encompasses an arc of approximately 180°.

References Cited in the file of this patent

UNITED STATES PATENTS

| | | |
|---|---|---|
| 582,485 | Reeves | May 11, 1897 |
| 722,567 | Crawford | Mar. 10, 1903 |
| 1,840,082 | Breer | Jan. 5, 1932 |
| 1,988,048 | Peik | Jan. 15, 1935 |
| 2,041,767 | Jack | May 26, 1936 |
| 2,043,731 | Bourne | June 9, 1936 |
| 2,056,608 | Jack | Oct. 6, 1936 |
| 2,075,263 | Bourne | Mar. 30, 1937 |
| 2,130,495 | Hoover | Sept. 20, 1938 |
| 2,273,092 | Dole | Feb. 17, 1942 |
| 2,514,520 | Sauer | July 11, 1950 |
| 2,543,461 | Latulippe | Feb. 27, 1951 |

FOREIGN PATENTS

| | | |
|---|---|---|
| 495,576 | Great Britain | Nov. 16, 1938 |